US011939983B1

(12) United States Patent
Carlson et al.

(10) Patent No.: US 11,939,983 B1
(45) Date of Patent: Mar. 26, 2024

(54) CENTRIFUGAL BLOWER

(71) Applicant: Accessible Technologies, Inc., Lenexa, KS (US)

(72) Inventors: Michael A. Carlson, Stanley, KS (US); Ryan L Jackson, Kansas City, MO (US); Justin R. Gomez, Merriam, KS (US)

(73) Assignee: Accessible Technologies, Inc., Lenexa, KS (US)

( * ) Notice: Subject to any disclaimer, the term of this patent is extended or adjusted under 35 U.S.C. 154(b) by 0 days.

(21) Appl. No.: 17/943,421

(22) Filed: Sep. 13, 2022

(51) Int. Cl.

| | |
|---|---|
| ***F04D 25/02*** | (2006.01) |
| ***F02B 33/40*** | (2006.01) |
| ***F02B 39/04*** | (2006.01) |
| ***F04D 25/06*** | (2006.01) |
| ***F04D 29/16*** | (2006.01) |
| ***F04D 29/28*** | (2006.01) |
| ***F04D 29/58*** | (2006.01) |
| *F04D 17/16* | (2006.01) |
| *F04D 29/063* | (2006.01) |
| *F04D 29/70* | (2006.01) |

(52) U.S. Cl.
CPC .............. *F04D 25/02* (2013.01); *F02B 33/40* (2013.01); *F02B 39/04* (2013.01); *F04D 25/06* (2013.01); *F04D 29/162* (2013.01); *F04D 29/284* (2013.01); *F04D 29/5806* (2013.01); *F04D 17/16* (2013.01); *F04D 29/063* (2013.01); *F04D 29/5853* (2013.01); *F04D 29/703* (2013.01)

(58) Field of Classification Search
CPC ........ F04D 25/02; F04D 29/063; F04D 25/06; F04D 29/284; F04D 29/162; F04D 29/5806; F02B 39/04; F02B 33/40
See application file for complete search history.

(56) References Cited

U.S. PATENT DOCUMENTS

| | | | | |
|---|---|---|---|---|
| 5,947,854 | A * | 9/1999 | Kopko | F16H 3/72 475/2 |
| 7,384,247 | B2 * | 6/2008 | Anderson | F04D 25/02 417/362 |
| 10,590,835 | B2 * | 3/2020 | Boehn | F16H 57/023 |
| 2015/0040718 | A1 * | 2/2015 | Taylor | F16H 57/027 74/606 R |

* cited by examiner

*Primary Examiner* — Peter J Bertheaud
(74) *Attorney, Agent, or Firm* — Erise IP, P.A.

(57) ABSTRACT

A centrifugal blower is described herein. The centrifugal blower may be a belt-driven geared centrifugal blower. The centrifugal blower may comprise an impeller, an inlet, and an outlet. The impeller pulls air in through the inlet, compresses and speeds up the air, and directs the air out the outlet. A motor may power a pulley system coupled to the belt that, in turn, drives a gear set. The gear set then drives the impeller. A mounting frame for the centrifugal blower may comprise a plurality of mounting holes for increasing the airflow to the gear set for cooling there. A belt tensioner may be coupled to the pulley system for setting a preload in the pulley system. An adjustment system for adjusting the tension provided by the belt tensioner is disclosed.

20 Claims, 11 Drawing Sheets

CENTRIFUGAL BLOWER

BACKGROUND

1. Field

Embodiments of the present disclosure are directed to centrifugal blowers. More specifically, embodiments of the present disclosure relate to a centrifugal blower having improved cooling and belt tension control.

2. Related Art

Centrifugal blowers are mechanical devices that pull air in through an inlet via an impeller, whereby the impeller pressurizes and accelerates the air. The air is then directed to an outlet. Often, the direction of the air changes from the inlet to the outlet (e.g., a 90° change in direction). Centrifugal blowers can be directly driven (i.e., a motor directly drives the impeller) or indirectly driven. Indirectly driven blowers may use a pulley system, a gear system, or a combination thereof, or the like to transfer power from the motor to the impeller. Centrifugal blowers are used in various applications, such as in wastewater treatment and cooling and drying systems.

For geared centrifugal blowers, heat transferred from the compressor to the gearbox can lower the life of the blower. For belt-driven blowers, it is often difficult to finely adjust a tension in the belt. Belt tensioners, such as friction clamped tensioners, can suffer slippage over time. Keys or fixed bolts may be used to set positive positional locations; however, these methods fail to provide fine adjustability in setting a preload in the belt. What is needed are improved centrifugal blowers. Further, what is needed is a centrifugal blower with improved cooling. Further still, what is needed is a centrifugal blower with an improved belt-tensioning system for tensioning a pulley belt.

SUMMARY

In some aspects, the techniques described herein relate to a centrifugal blower, including: a pulley system, including: a driving pulley coupled to a motor; a driven pulley; and a pulley belt coupled to the driving pulley and the driven pulley; a gear set coupled to the driven pulley; a mounting frame, wherein the pulley system is mounted to a first side of the mounting frame and the gear set is mounted to a second side of the mounting frame, and wherein the mounting frame include a plurality of cooling holes for directing cooling air from the first side to the second side; and a centrifugal compressor, including: an inlet; an outlet; and an impeller driven by the gear set and configured to pull air into the inlet, compress the air, and direct the air to the outlet.

In some aspects, the techniques described herein relate to a centrifugal blower, wherein a plurality of channels emanates from the plurality of cooling holes on the second side of the mounting frame for increasing airflow to the gear set.

In some aspects, the techniques described herein relate to a centrifugal blower, further including: a belt guard coupled to the first side of the mounting frame and including an air inlet, and wherein the driving pulley includes a plurality of fan blades configured to draw air in through the air inlet.

In some aspects, the techniques described herein relate to a centrifugal blower, further including a belt tensioner in contact with the pulley belt to set a preload in the pulley belt.

In some aspects, the techniques described herein relate to a centrifugal blower, further comprising an adjustment system for incrementally adjusting a position of the belt tensioner.

In some aspects, the techniques described herein relate to a centrifugal blower, wherein the gear set includes a driving gear meshed with a pinion gear.

In some aspects, the techniques described herein relate to a centrifugal blower, further including: an inner plate coupled to a gearbox housing the gear set on a side opposite the mounting frame, the inner plate including a recessed portion; and thermal insulation disposed in the recessed portion for reducing an amount of heat transfer to the gearbox from the centrifugal compressor.

In some aspects, the techniques described herein relate to a centrifugal blower, including: a motor; a centrifugal compressor; and a drive system, including: a pulley system; a belt tensioner coupled to the pulley system; and a gear set including an input gear and an output gear, wherein the pulley system is driven by the motor to drive the gear set and the gear set drives the centrifugal compressor; and a mounting frame having the belt tensioner and the drive system mounted thereon; and an adjustment system for adjusting a position of the belt tensioner to adjust a preload in a pulley belt of the pulley system.

In some aspects, the techniques described herein relate to a centrifugal blower, wherein the adjustment system includes: a proximal plate coupled to the belt tensioner, the proximal plate having a first plurality of holes about at least a portion of a circumference thereof, wherein each hole of the first plurality of holes is separated by a first distance; and an outer plate disposed within an opening of the mounting frame, the outer plate having a second plurality of holes about a circumference thereof, wherein each hole of the second plurality of holes is separated by a second distance; an inner plate configured to be received within the outer plate; and a distal plate having a third plurality of holes about a circumference thereof, wherein each hole of the third plurality of holes is separated by the first distance, wherein the first distance is distinct from the second distance.

In some aspects, the techniques described herein relate to a centrifugal blower, wherein rotation of the belt tensioner rotates the proximal plate, thereby changing an alignment of the first plurality of holes with the second plurality of holes, and wherein the position of the belt tensioner is fixed by coupling the proximal plate to the distal plate via a fastener inserted through a hole of the first plurality of holes that is at least partially aligned with corresponding holes in the second plurality of holes and the third plurality of holes.

In some aspects, the techniques described herein relate to a centrifugal blower, wherein the adjustment system is configured to adjust an angle of the belt tensioner in increments in the range of 0.5 degrees to 10 degrees.

In some aspects, the techniques described herein relate to a centrifugal blower, wherein the mounting frame includes a recess for receiving a gearbox housing the gear set, and wherein the recess includes a plurality of channels to increase airflow to the gear set.

In some aspects, the techniques described herein relate to a centrifugal blower, further including: a plurality of cooling holes extending through the mounting frame, the plurality of cooling holes disposed proximally to the gear set, wherein the plurality of channels emanates from the plurality of cooling holes.

In some aspects, the techniques described herein relate to a geared centrifugal blower, including: a mounting frame; a motor having a shaft extending through the mounting frame;

a centrifugal compressor; and a drive system, including: a pulley system including a driving pulley coupled to the shaft and a driven pulley, the driving pulley and the driven pulley interconnected by a pulley belt; and a gear set coupled to the driven pulley via an input shaft and to the centrifugal compressor; a plurality of cooling holes in the mounting frame, the plurality of cooling holes surrounding the driven pulley; a belt tensioner for setting a preload in the pulley belt; and an adjustment system for adjusting a position of the belt tensioner to adjust the preload in the pulley belt.

In some aspects, the techniques described herein relate to a geared centrifugal blower, wherein the mounting frame includes a recess for receiving a gearbox for the gear set, wherein the recess is fluidly connected to the plurality of cooling holes, and wherein the recess includes a plurality of channels emanating from the plurality of cooling holes for increasing airflow around the gearbox.

In some aspects, the techniques described herein relate to a geared centrifugal blower, further including: an inner plate disposed between the gearbox and the centrifugal compressor, wherein the inner plate includes a recessed surface for receiving insulation therein, thereby reducing heat transferred from the centrifugal compressor to the gearbox.

In some aspects, the techniques described herein relate to a geared centrifugal blower, further including: a belt guard for encasing the pulley system, the belt guard having an air inlet located proximal to the driving pulley, wherein the driving pulley includes a plurality of fan blades that pull air in the air inlet when the driving pulley is rotated by the motor.

In some aspects, the techniques described herein relate to a geared centrifugal blower, wherein the adjustment system is configured to incrementally adjust a position of the belt tensioner to adjust a preload in the pulley belt provided by the belt tensioner.

In some aspects, the techniques described herein relate to a geared centrifugal blower, wherein the motor is driven by a variable frequency drive system.

In some aspects, the techniques described herein relate to a geared centrifugal blower, further including a desiccant breather coupled to a gearbox housing the gear set.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE FIGURES

Embodiments of the present disclosure are described in detail below with reference to the attached drawing figures, wherein.

Figure 1A:
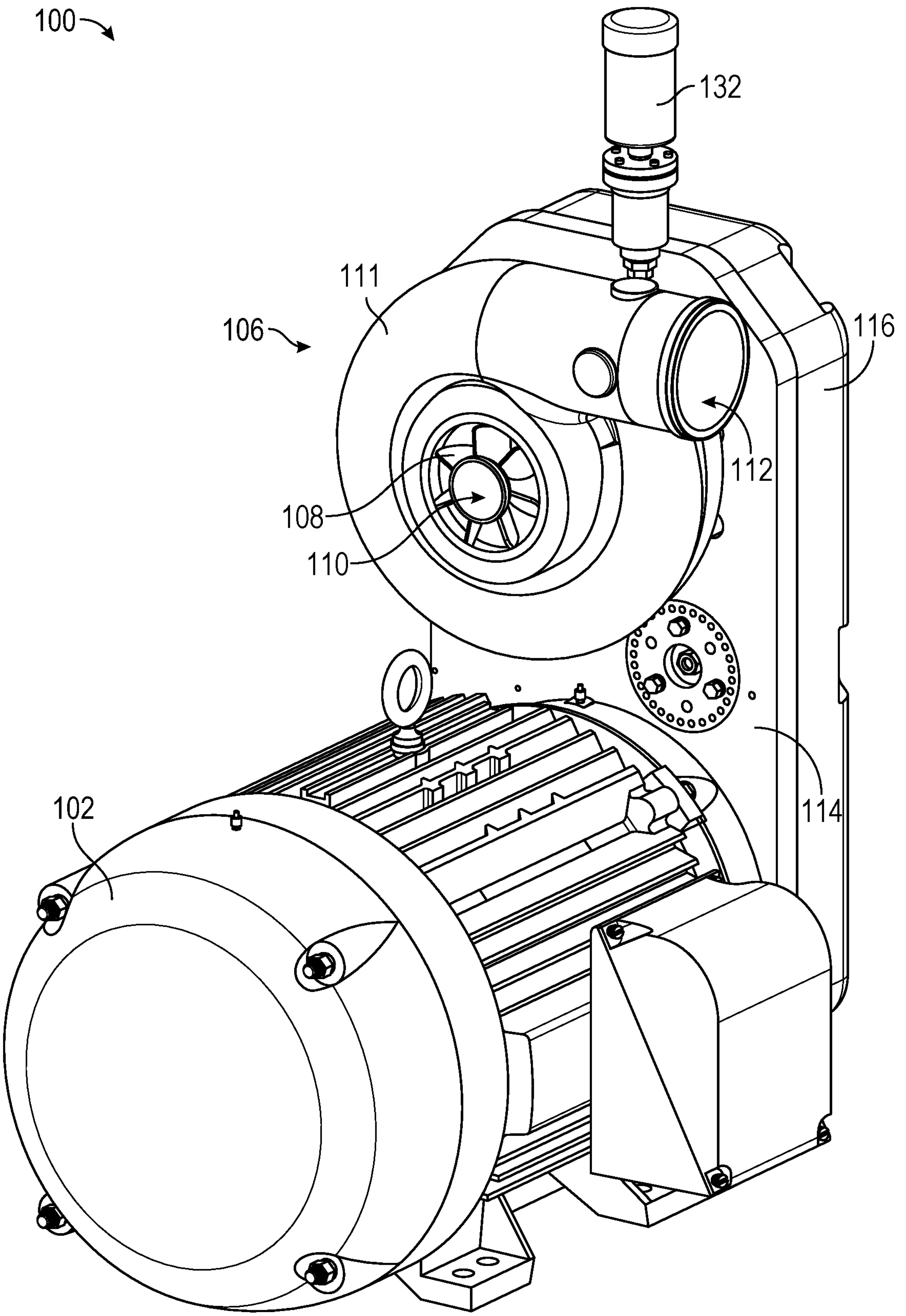
FIG. 1A illustrates a perspective view of a centrifugal blower for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments of the present disclosure are generally directed to centrifugal blowers. The centrifugal blower may comprise a motor driving a pulley system that drives a gear set to power a centrifugal compressor. Various cooling improvements to centrifugal blowers are described herein. Increasing the cooling of the centrifugal blower may lead to a longer life of the centrifugal blower. A vernier adjustment system for finely adjusting a belt tension in the pulley belt is also described herein.

FIG. 1A illustrates a perspective view of a centrifugal blower 100 for some embodiments. Centrifugal blower 100 may comprise a motor 102 driving a drive system 104 (see FIGS. 1B and 3) that, in turn, drives an impeller 108 housed within compressor housing 106. In some embodiments, motor 102 is an electric motor, a hydraulic motor, a pneumatic motor, or any other type of motor. In some embodiments, motor 102 is an AC motor driven by a variable frequency drive. In some embodiments, the variable frequency drive is a 50/60 Hz variable frequency drive. In some embodiments, motor 102 has a horsepower of up to about 75 horsepower. In other embodiments, motor 102 has a horsepower greater than about 75 horsepower. Various other sized motors may be used. In some embodiments, motor 102 is configured to be mounted to a surface (e.g., the floor) to hold centrifugal blower 100 stationary.

The centrifugal compressor may comprise a compressor housing 106 that houses an impeller 108. Impeller 108 may draw air from the environment into an inlet 110 of compressor housing 106, whereby the air is compressed and accelerated through a scroll 111 before exiting via outlet 112. In some embodiments, the blades of impeller 108 are backswept, forward swept, or the like. In some embodiments, outlet 112 is substantially perpendicular to inlet 110. Outlet 112 may take various angles with respect to inlet 110 to redirect the air in a desired direction. Centrifugal blower 100 may comprise a mounting frame 114 to which various components (discussed below) are mounted (directly or indirectly). A belt guard 116 may be coupled to a first side of mounting frame 114 and encase various components mounted to mounting frame 114.

Centrifugal blower 100 may be used in various applications such as, but not limited to, aeration, combustion air, laboratory component testing, electronic component cooling, and municipal wastewater treatment. In some embodiments, centrifugal blower 100 is provided as a standalone device. In other embodiments, centrifugal blower 100 may be used within a larger assembly, such as for use in wastewater treatment facilities. In some embodiments, centrifugal blower 100 may be controlled by a control system and operated based on programmed instructions. In some embodiments, centrifugal blower 100 is operated via an on/off power switch.

Figure 1B:
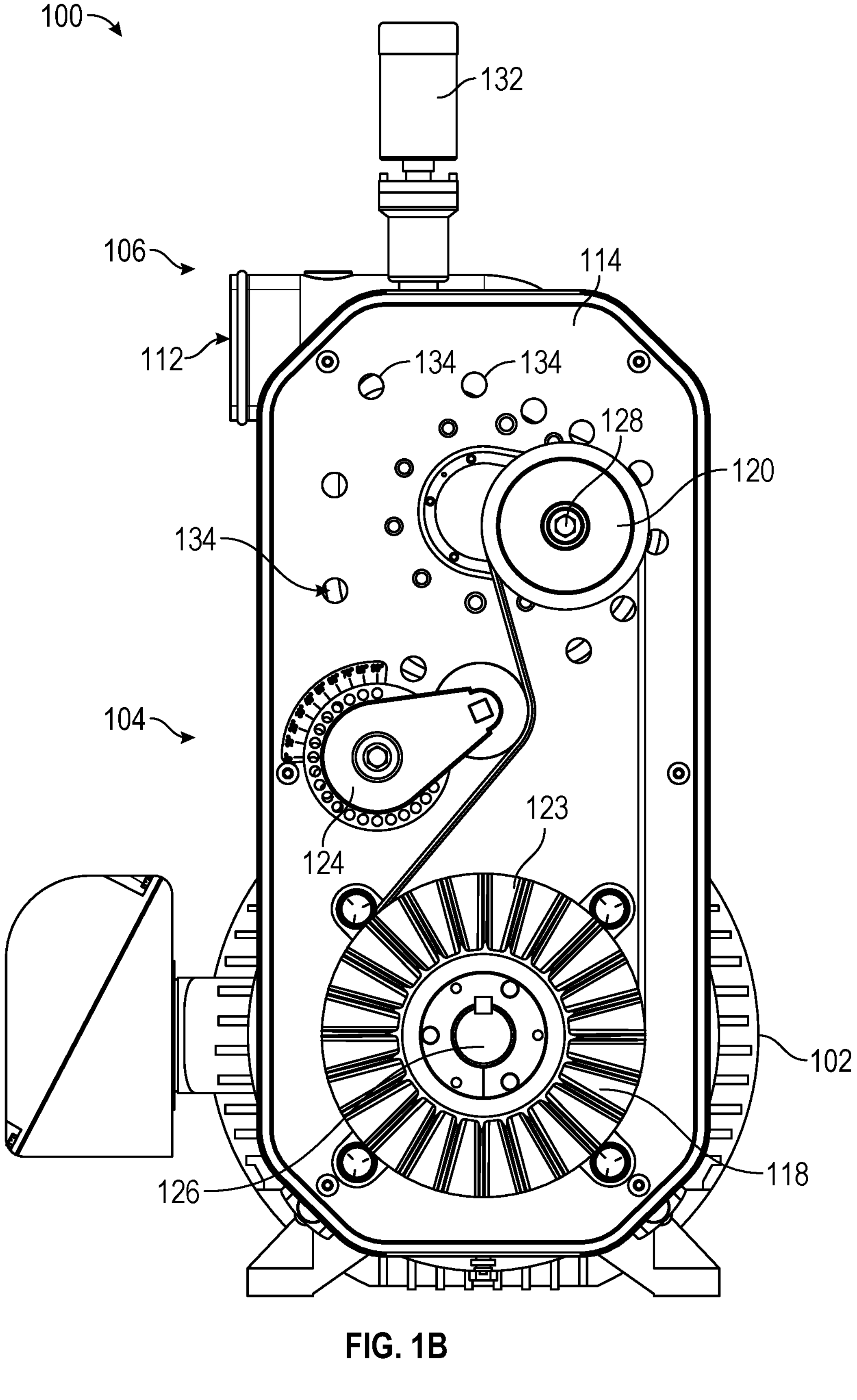
FIG. 1B illustrates a first front view of the centrifugal blower for some embodiments.

FIG. 1B illustrates a front view of centrifugal blower 100 with belt guard 116 removed to show various components coupled to the first side of mounting frame 114.

Drive system 104 may comprise a pulley system having a drive pulley 118 and a driven pulley 120 interconnected by a pulley belt 122. Drive pulley 118 may be disposed in a lower portion of mounting frame 114, and driven pulley 120 may be disposed in an upper portion of mounting frame 114. In some embodiments, drive pulley 118 comprises a plurality of fan blades 123 thereon to draw air through belt guard 116. As shown in FIG. 1D, belt guard 116 may comprise an air inlet 138 located substantially in-line with drive pulley 118 through which air pulled by fan blades 123 may enter to cool centrifugal blower 100. In some embodiments, drive pulley 118 comprises a larger diameter than driven pulley 120. In some embodiments, a ratio of the diameter of drive pulley 118 to driven pulley 120 is about 1.69 or above. Various diameter ratios may be used without departing from the scope hereof to obtain a desired speed or torque of driven pulley 120.

A belt tensioner 124 may be in contact with pulley belt 122 between drive pulley 118 and driven pulley 120. Belt tensioner 124 may be a rotary tensioner or a linear tensioner. Belt tensioner 124 may be coupled to (or held in contact with) pulley belt 122 to add preload thereto. In some embodiments, belt tensioner 124 is formed as a sheave for coupling with pulley belt 122. In some embodiments, an outer surface of belt tensioner 124 is flat or flanged. In some embodiments, belt tensioner 124 is spring loaded and/or may comprise hydraulic damping. Belt tensioner 124 may be rotated to adjust an amount of preload in pulley belt 122. In some embodiments, belt tensioner 124 is adjustable via a vernier adjustment system to provide finite adjustments to the position of belt tensioner 124 and, therefore, to the tension in pulley belt 122, as discussed further below. In some embodiments, idler pulleys may be used with the pulley system.

Drive pulley 118 may be mounted on a motor shaft 126 of motor 102 that extends through mounting frame 114. In some embodiments, a bushing is coupled to an outer surface of motor shaft 126, and drive pulley 118 sits on an outer surface of the bushing. In operation, motor 102 drives motor shaft 126 to rotate drive pulley 118, and drive pulley 118 drives pulley belt 122 to rotate driven pulley 120. Rotation of driven pulley 120 rotates an input shaft 128 to drive a gear set 300 (see FIG. 3) that, in turn, drives impeller 108.

Figure 1C:
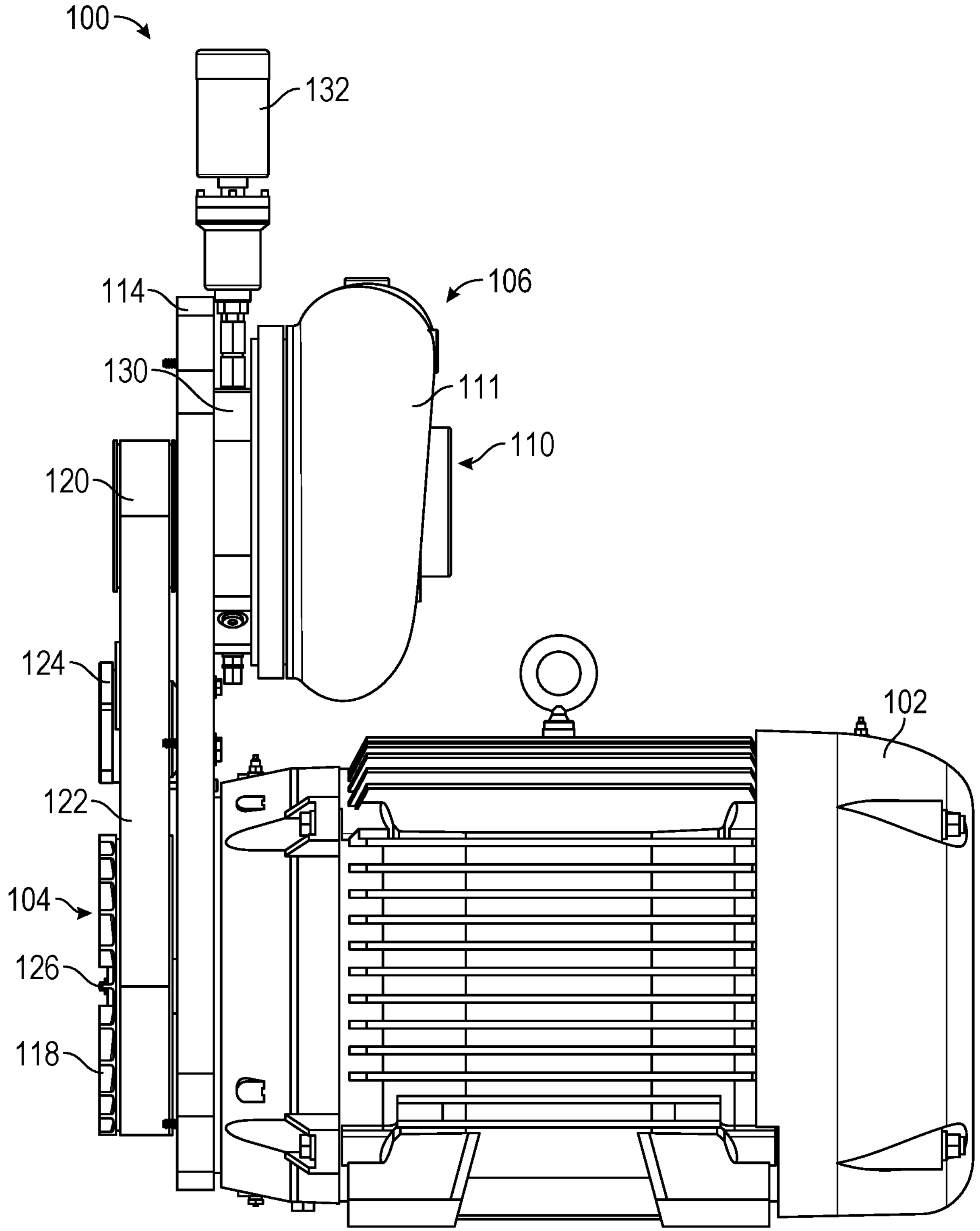
FIG. 1C illustrates a side view of the centrifugal blower for some embodiments.
Figure 1D:
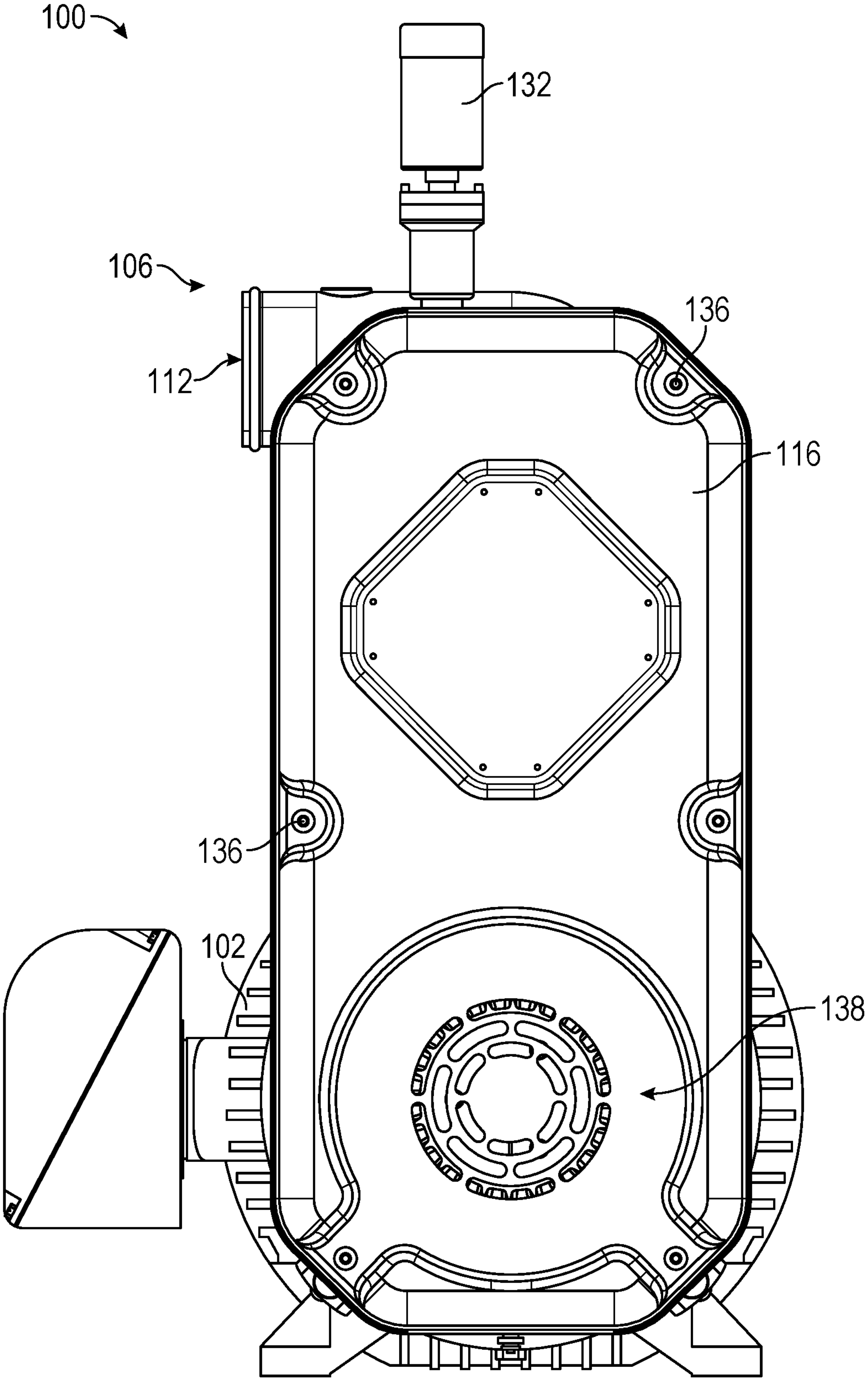
FIG. 1D illustrates a second front view of the centrifugal blower for some embodiments.
Figure 2:
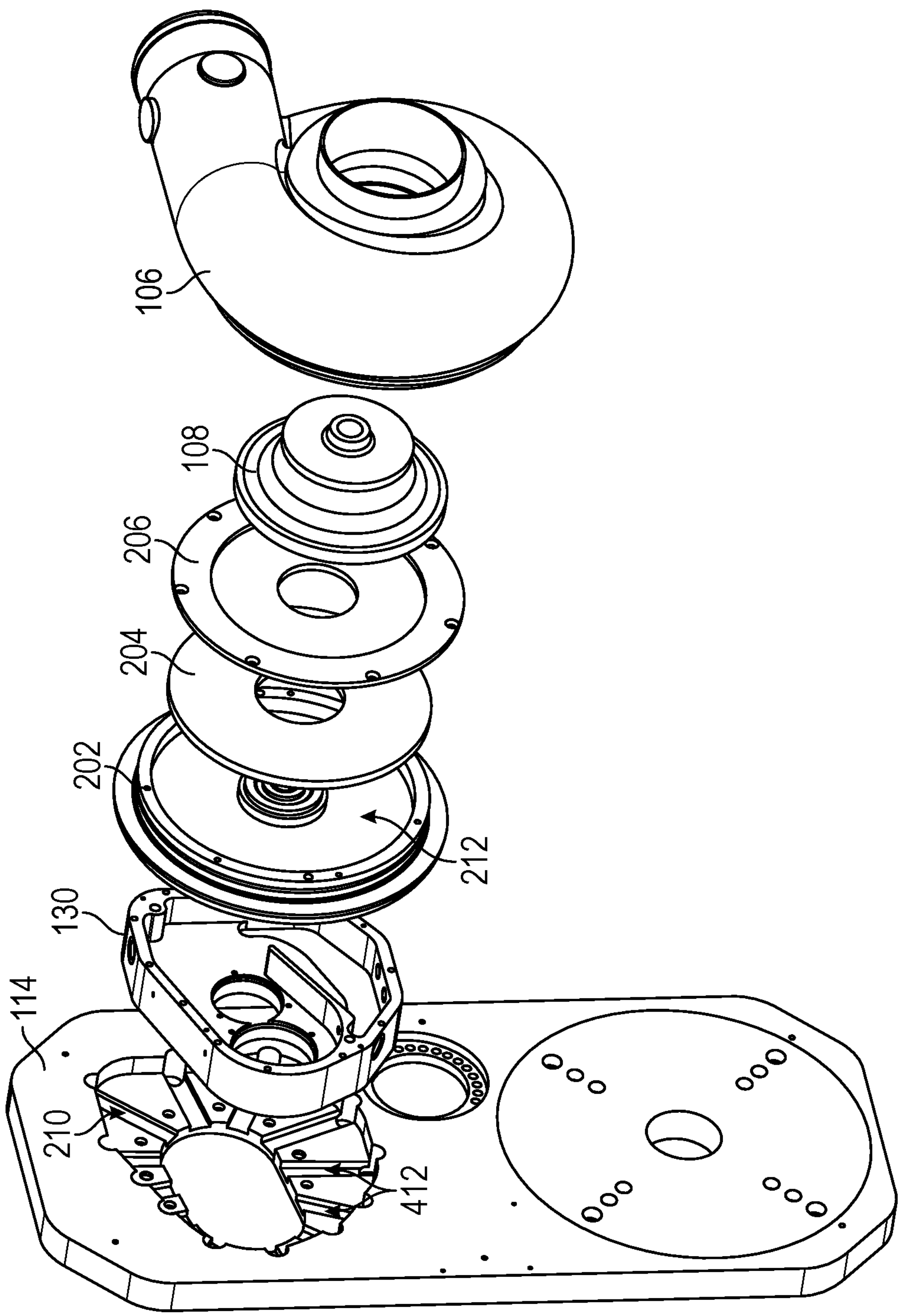
FIG. 2 illustrates an exploded view of the centrifugal blower for some embodiments.

As illustrated in the side view shown in FIG. 1C, a gearbox 130 may be disposed between mounting frame 114 and compressor housing 106. Gearbox 130 may be coupled on a first or front side to mounting frame 114 and on a second or back side to inner plate 202 (FIG. 2). Compressor housing 106 may also be mounted to inner plate 202 on a side opposite gearbox 130. Gearbox 130 may house a gear set 300 (FIG. 3) that is driven by input shaft 128 to drive impeller 108. A desiccant breather 132 may be coupled to gearbox 130 to prevent contaminants from entering gearbox 130.

Turning back to FIG. 1B, mounting frame 114 may further comprise a plurality of cooling holes 134 extending therethrough. Air drawn in from the environment by drive pulley 118 may pass from the first side of mounting frame 114, via cooling holes 134, to the back side of mounting frame 114 to cool gearbox 130. The use of cooling holes 134 may improve the cooling of centrifugal blower 100 compared to traditional centrifugal blowers. In some embodiments, cooling holes 134 are arranged in an upper portion of mounting frame 114 and are substantially in-line with gearbox 130. In some embodiments, cooling holes 134 may surround pulley belt 122. In some embodiments, the number of cooling holes 134 is in the range of 1 to 20. In some embodiments, the number of cooling holes 134 is 12. As shown in FIGS. 2 and 4B, on the back side of mounting frame 114, cooling holes 134 may transition into channels that are recessed within a mounting surface of mounting frame 114 to further improve the transfer of cooling air to gearbox 130.

FIG. 1D illustrates a front view of centrifugal blower 100 with belt guard 116 coupled to mounting frame 114 for some embodiments. As shown, belt guard 116 may substantially match the geometry of mounting frame 114. In some embodiments, belt guard 116 is formed from a sound insulating material to mitigate sounds from centrifugal blower 100. In some embodiments, belt guard 116 is lined with a sound damping material on an inner surface thereof. Belt guard 116 may be secured to mounting frame 114 via various fasteners 136 inserted within corresponding fastener holes on mounting frame 114 such that belt guard 116 is removably attachable thereto.

As described above, belt guard 116 may comprise an air inlet 138 through which fan blades 123 on drive pulley 118 may draw in air for cooling centrifugal blower 100. Air inlet 138 may be formed by various perforations, slots, apertures, or the like in belt guard 116. In some embodiments, air inlet 138 is in a recessed portion of belt guard 116. In some embodiments, belt guard 116 comprises more than one air inlet. For example, a second air inlet may be located near driven pulley 120. In some embodiments, an external cooling source is provided for providing cooling air to centrifugal blower 100.

FIG. 2 illustrates an exploded view of various components of centrifugal blower 100 that are coupled to the second side of mounting frame 114 for some embodiments.

Specifically, depicted in FIG. 2 are mounting frame 114, gearbox 130, inner plate 202, insulation 204, outer plate 206, impeller 108 (illustrated in FIG. 2 as an impeller blank), and compressor housing 106.

Gearbox 130 may be received and mounted within a recessed mounting bracket 210 of mounting frame 114. On a side opposite mounting frame 114, gearbox 130 may be coupled to inner plate 202 such that gearbox 130 is sandwiched between mounting frame 114 and inner plate 202. Various fasteners may be used to couple gearbox 130 to mounting frame 114 and inner plate 202 as is known to those skilled in the art. Inner plate 202 may comprise a recessed portion 212 configured to receive insulation 204 therein. In some embodiments, recessed portion 212 is circular in shape; however, other geometries are within the scope hereof. Insulation 204 may be formed to match the shape of recessed portion 212. Insulation 204 may be configured to provide thermal insulation to reduce the amount of heat transferred from the compressor to gearbox 130 during operation. In some embodiments, insulation 204 comprises a fiberglass, such as GLASTHERM®. Various other thermally insulating materials may be used. By providing thermal insulation between gearbox 130 and the compressor, the amount of heat transferred from the compressor to gearbox 130 may be reduced, and gearbox 130 may operate at cooler temperatures as compared to traditional blowers, leading to longer component life and higher efficiencies.

Adjacent to insulation 204 is outer plate 206, and adjacent to outer plate 206 is impeller 108. Outer plate 206 and impeller 108 may be received within an opening of compressor housing 106. A pinion gear 304 (see FIG. 3) may be driven by the gear set 300 to drive impeller 108 to pull air in through inlet 110. An impeller fastener 306 may extend from gearbox 130 and through each of inner plate 202, outer plate 206, and may be coupled to impeller 108.

Figure 3:
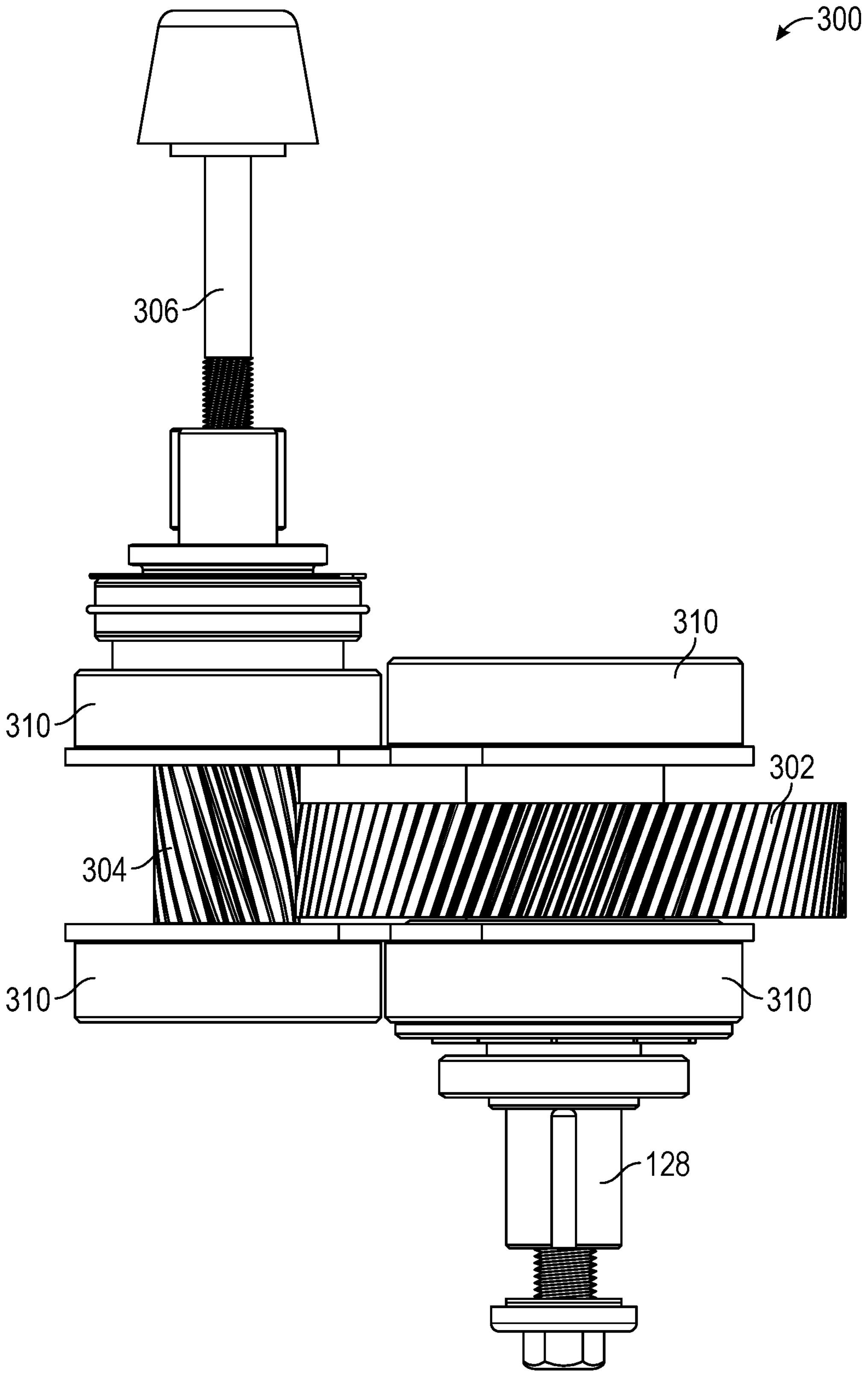
FIG. 3 illustrates a gear system for the centrifugal blower for some embodiments.

FIG. 3 illustrates a top-down view of gear set 300 for some embodiments of the present disclosure. Gear set 300 may comprise an input gear 302 and an output or pinion gear 304. Input gear 302 may be coupled to input shaft 128, which is driven by the pulley system as discussed above. Input gear 302 is meshed with pinion gear 304. In some embodiments, gears 302, 304 are helical gears. In some embodiments, gears 302, 304 are spur gears. An impeller fastener 306 (e.g., a bolt) coupled to pinion gear 304 and impeller bullet may retain impeller 108 on pinion gear 304. Various bearings (e.g., spherical roller bearings) may be used within gearbox 130 and may be housed within sleeves 310. In some embodiments, gear set 300 comprises four sleeves 310, with two sleeves 310 disposed on either side of each gear 302, 304. In some embodiments, the bearings are preloaded to direct the axial load towards impeller 108. Gearbox 130 may be lubricated as is known to those skilled in the art. As described above, the heat transfer from impeller 108 to gearbox 130 may be reduced by the use of insulation 204 in recessed portion 212 between gearbox 130 and compressor housing 106.

Figure 4A:
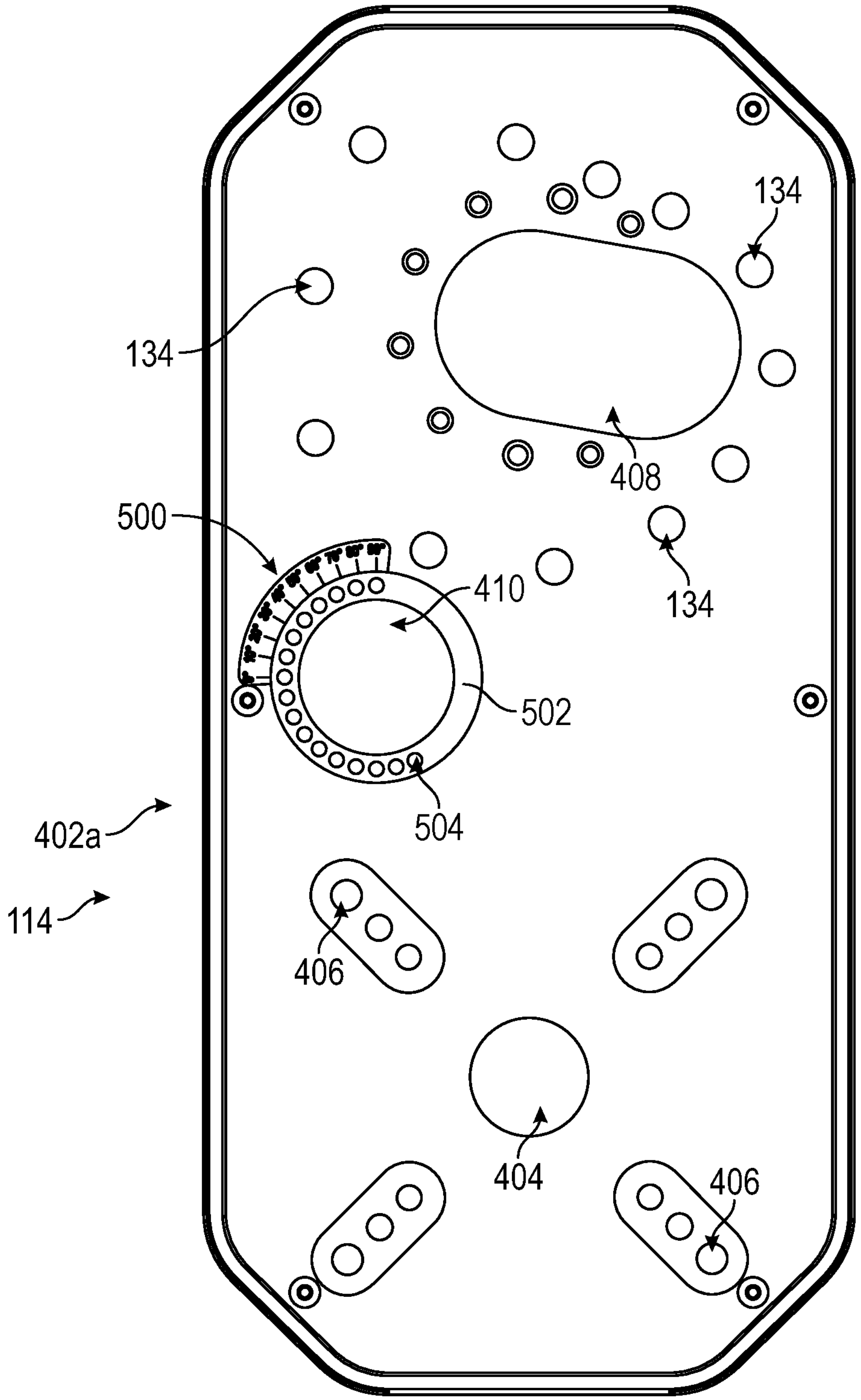
FIG. 4A illustrates a planar view of a first side of a mounting frame of the centrifugal blower for some embodiments.
Figure 4B:
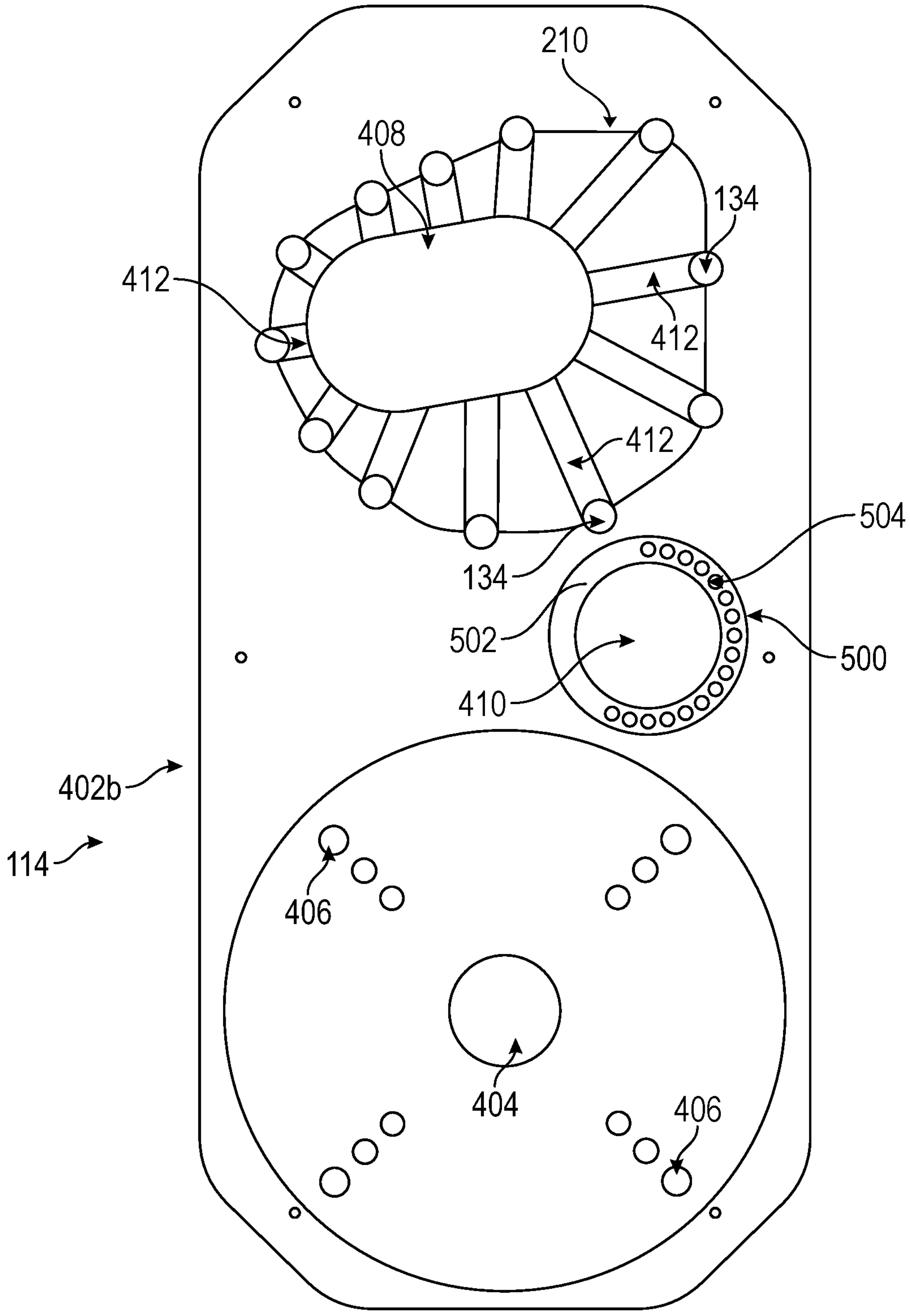
FIG. 4B illustrates a planar view of a second side of the mounting frame for some embodiments.

FIG. 4A illustrates a planar view of a first side 402*a* of mounting frame 114 for some embodiments, and FIG. 4B illustrates a planar view of a second side 402*b* of mounting frame 114 for some embodiments. As described above, the pulleys 118, 120 may be coupled to the first side 402*a* of mounting frame 114, and gear set 300 may be coupled to second side 402*b*.

A lower portion (e.g., a lower half) of mounting frame 114 may comprise a first opening 404 for receiving motor shaft 126 of motor 102 therethrough. A plurality of motor mounting holes 406 may be arranged around first opening 404 for coupling motor 102 to mounting frame 114. Multiple motor mounting holes 406 may be provided to allow for various sized motors to be coupled to mounting frame 114. A second opening 408 may be located in an upper portion (e.g., an upper half) of mounting frame 114. Input shaft 128 may extend through second opening 408 and through the bracket and driven pulley 120 may be coupled thereto, as described above. The plurality of cooling holes 134 may surround the second opening 408, as shown.

Mounting frame 114 may also comprise an adjustment system opening 410 for receiving adjustment system 500 therein. Adjustment system 500 may comprise an outer plate 502 disposed within adjustment system opening 410. Outer plate 502 may comprise a plurality of adjustment holes 504, which are discussed further below with respect to FIGS. 5A-5C. Outer plate 502 may be a fixed part of mounting frame 114 such that outer plate 502 is immovable with respect to mounting frame 114. As shown best in FIG. 2, outer plate 502 may be located within adjustment system opening 410 such that 502 is not flush with either first side 402*a* or second side 402*b*.

As described above, second side 402*b* comprises a recessed mounting bracket 210 for mounting gearbox 130. The plurality of cooling holes 134 may extend through mounting frame 114, whereby cooling holes 134 transition into channels 412. In some embodiments, channels 412 extend from cooling holes 134 into second opening 408. Turning briefly back to FIG. 2, channels 412 may be recessed with respect to the surrounding material of recessed mounting bracket 210. In some embodiments, recessed mounting bracket 210 comprises twelve channels 412; however, additional or fewer channels 412 may be employed without departing from the scope hereof. Further, it will be appreciated that channels 412 are not limited to emanating from cooling holes 134 and channels 412 may be located in any portion of recessed mounting bracket 210. Channels 412 may increase the airflow to/around gearbox 130 from cooling holes 134, thereby leading to increased cooling of cooling holes 134. Increased cooling can lead to improved performance of gear set 300, along with a decrease in heat transfer from impeller 108 to gearbox 130.

Figure 5A:
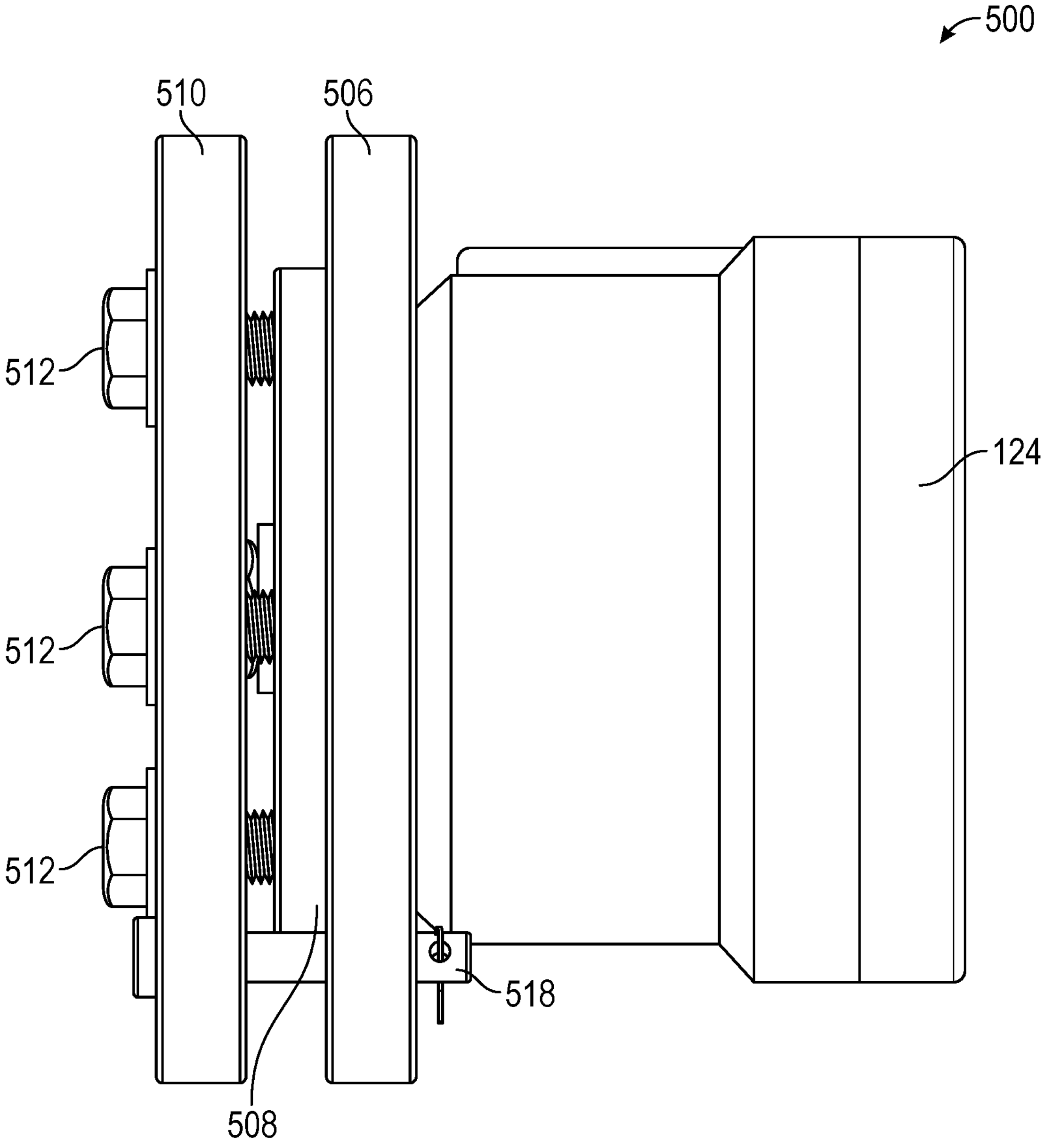
FIG. 5A illustrates a side view of an adjustment system for a belt tensioner for some embodiments.
Figure 5B:
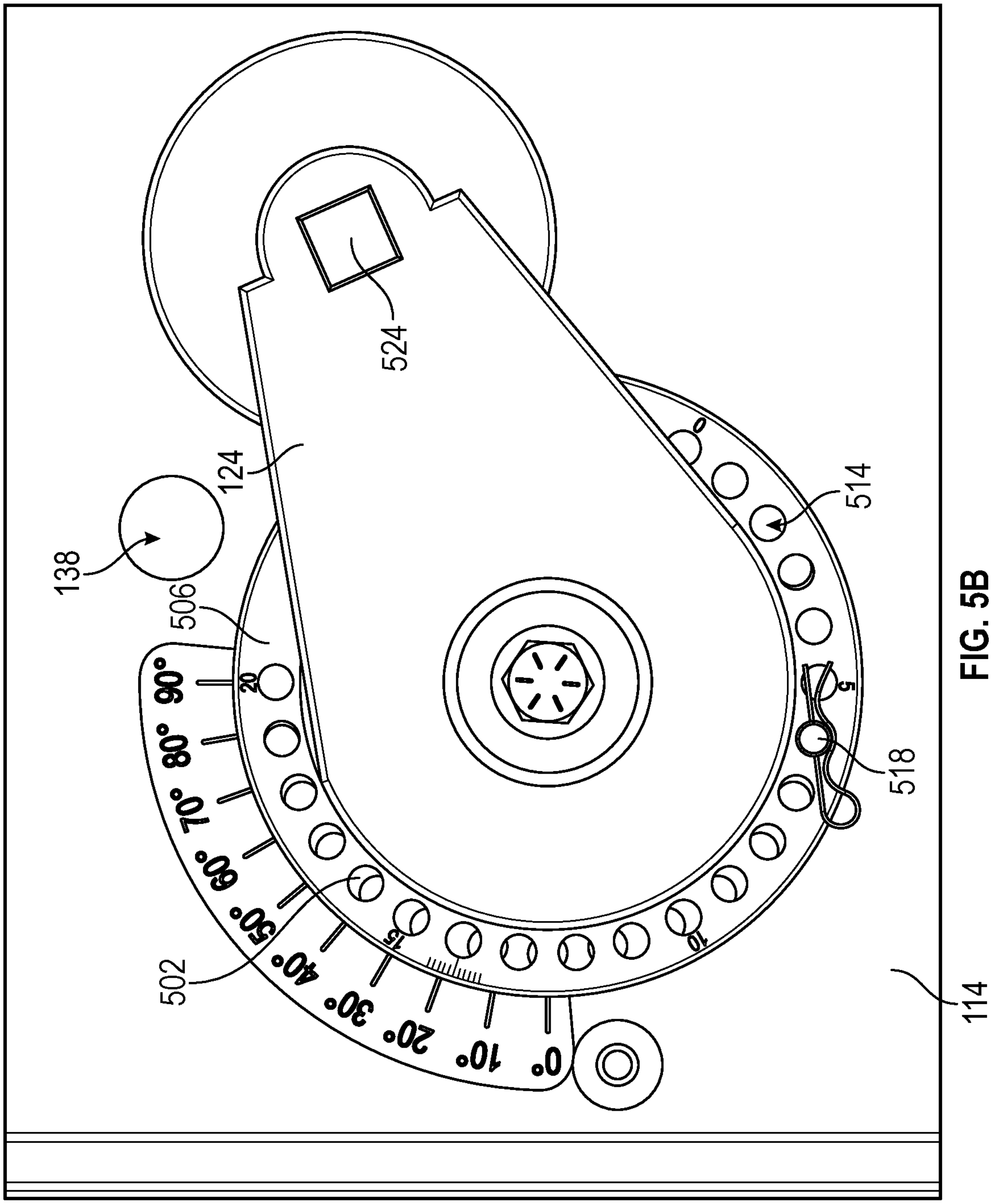
FIG. 5B illustrates a front view of the adjustment system for some embodiments.
Figure 5C:
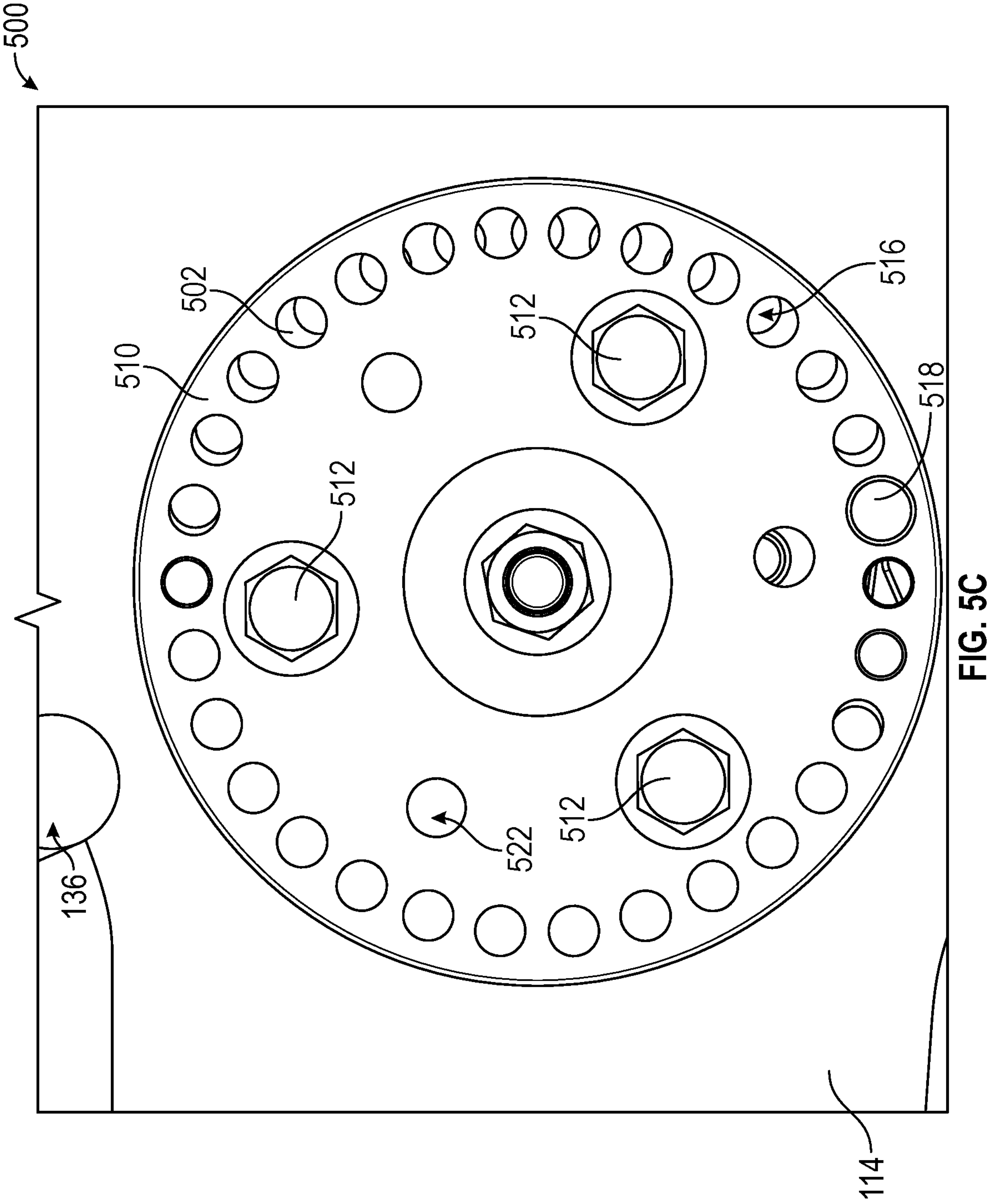
FIG. 5C illustrates a back view of the adjustment system for some embodiments.

Turning now to FIGS. 5A, 5B, and 5C, an adjustment system 500 for adjusting an angle of belt tensioner 124 is illustrated for some embodiments. FIG. 5A presents a side view of adjustment system 500; FIG. 5B presents a front view of adjustment system 500; and FIG. 5C presents a back view of portions of adjustment system 500. Adjusting the position of belt tensioner 124 allows for the tension applied to pulley belt 122 to be adjusted. By providing fine adjustments via adjustment system 500, an operator of centrifugal blower 100 has increased control of the performance of centrifugal blower 100. In some embodiments, adjustment system 500 is configured to adjust an angle of belt tensioner 124 in about 0.8 degree increments. However, adjustment system 500 may be configured to provide smaller or larger increment adjustments without departing from the scope hereof. For example, adjustment system 500 may be configured for 0.5, 1, 1.5, 2.5, 5, 7.5, or 10 degree increments. In some embodiments, adjustment system 500 is configured for linear adjustments.

Looking first at FIG. 5A, adjustment system 500 is illustrated with mounting frame 114 and outer plate 502 removed for clarity of illustration. A proximal plate 506 may be received within adjustment system opening 410 and abut against a face of outer plate 502. Proximal plate 506 may be substantially flush with first side 402*a* (FIG. 5B). An inner plate 508 may protrude from proximal plate 506. Inner plate

508 may be received within outer plate 502 such that an outer surface of inner plate 508 abuts or is concentric with an inner surface of outer plate 502. A distal plate 510 may be received within second opening 408 and may be substantially flush with second side 402*b* (FIG. 5C). One or more fasteners 512 may extend through distal plate 510 and thread into the inner plate 508 and proximal plate 506 to secure distal plate 510 to proximal plate 506. In some embodiments, a clevis pin abuts each plate 502, 506, 510 to secure adjustment system 500 in a particular angular position.

FIG. 5B illustrates a front view of adjustment system 500 within mounting frame 114 for some embodiments. As shown, proximal plate 506 may comprise a plurality of adjustment holes 514 extending along at least a portion of a circumference thereof. In some embodiments, proximal plate 506 comprises twenty one adjustment holes 514. Scale markings on proximal plate 506 may indicate every fifth adjustment hole. Mounting frame 114 may also comprise scale markings proximal to a portion of the perimeter of proximal plate 506 to indicate a degree of rotation of belt tensioner 124, as shown in FIG.

FIG. 5C illustrates a back view of adjustment system 500 with mounting frame 114 for some embodiments. Distal plate 510 may comprise a third plurality of adjustment holes 516 along a circumference thereof. Adjustment holes 516 may comprise the same diameter as adjustment holes 504, 514 and may be substantially in-line with adjustment holes 514 on proximal plate 506, while a subset of adjustment holes 504 are not in-line with adjustment holes 514, 516 at any given position of proximal plate 506, thereby obstructing the insertion of a fastener through adjustment holes 514, 516. To facilitate the incremental adjustment (linear or rotational) of belt tensioner 124, the spacing of adjustment holes 514 on proximal plate 506 matches the spacing of adjustment holes 516 on distal plate 510 and is distinct from the spacing of adjustment holes 504 on outer plate 502. The distinct spacing of adjustment holes 504 on outer plate 502 provides for finite, incremental adjustments to be made to the position of belt tensioner 124. In some embodiments, the spacing or distance between adjacent holes on proximal plate 506 and distal plate 510 is larger than the spacing between adjacent holes on outer plate 502. In other embodiments, the spacing between holes on outer plate 502 is larger than on proximal plate 506 and distal plate 510.

Distal plate 510 may also comprise a plurality of mounting holes 522 through which fasteners 512 may be received. In some embodiments, distal plate 510 comprises six mounting holes 522 that are evenly spaced. Distal plate 510 may comprise any number of mounting holes 522. Fasteners 512 may extend through mounting holes 522 and further through corresponding holes (not shown) in inner plate 508 to secure distal plate 510 to proximal plate 506. Fasteners 512 also secures proximal plate 506 and distal plate 510 to outer plate 502 by clamping to secure belt tensioner 124.

To adjust and set the position of belt tensioner 124, an operator may insert a tool (e.g., a ratchet) into an opening 524 and apply a rotational force thereto. Rotation of belt tensioner 124 may rotate proximal plate 506, thereby changing the position of the plurality of adjustment holes 514. The increment of adjustment available for adjustment system 500 is determined by the number of holes per angular range. That is, the degrees between each hole defines the adjustment increment. For example, each of adjustment holes 514, 516 may be separated by 1 degree, and adjustment holes 504 may be spaced accordingly to allow for an alignment pin 518 (discussed below) to set the position of belt tensioner 124.

As described above, in some embodiments, adjustment system 500 is configured to adjust the position of belt tensioner 124 in about 0.8 degree increments. Other increments (linear or rotational) may be used without departing from the scope hereof. The holes may be patterned, and for linear adjustments, the pattern may be repeated twice, while for rotational adjustments, the pattern may repeat thrice. In some embodiments, the number of times the pattern is repeated is based on the degree of incremental adjustment that adjustment system 500 is configured for. As described above, inner plate 508 may protrude from proximal plate 506 such that rotation of proximal plate 506 causes corresponding rotation of inner plate 508.

Each of the plurality of adjustment holes 504, 514, 516 may comprise substantially the same diameter such that an alignment pin 518 may be inserted through aligned adjustment holes 504, 514, 516 to set a position of belt tensioner 124. The alignment pin 518 may be retained with a cotter pin. As shown in FIGS. 5B and 5C, the position of adjustment holes 504 may not be aligned with the position of adjustment holes 514, 516. Thus, based on the amount of rotation of belt tensioner 124 and proximal plate 506, adjustment holes 504 in outer plate 502 may obstruct the insertion of alignment pin 518 therethrough such alignment pin 518 can only be received within a subset of adjustment holes 504, 514, 516 at any given angular position of proximal plate 506. In some embodiments, alignment pin 518 comprises a smaller diameter than adjustment holes 504, 514, 516 such that adjustment holes 504, 514, 516 can be partially aligned and alignment pin 518 may be inserted therethrough to set the position of belt tensioner 124.

In some embodiments, centrifugal blower 100 may comprise an externally mounted oil pump to pump and/or filter oil to and from gearbox 130. The oil pump may be mounted to a side of mounting frame 114. For example, the oil pump may be mounted to either of sides 402*a*, 402*b*, or either of the two sides that are perpendicular to sides 402*a*, 402*b*. The oil pump may be belt driven. For example, a second pulley belt may be provided that is driven by motor shaft 126 to drive the oil pump. The second pulley belt may be coupled to drive pulley 118 or a second drive pulley 118 may be provided and coupled to motor shaft 126 and the second pulley belt coupled thereto. The oil pump may be fluidly connected to gearbox 130 and/or other components of centrifugal blower 100 to circulate oil thereto.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments, what is claimed as new and desired to be protected by Letters Patent includes the following:

1. A centrifugal blower, comprising:

a pulley system, comprising:

a driving pulley coupled to a motor;

a driven pulley; and a pulley belt coupled to the driving pulley and the driven pulley;

a gear set coupled to the driven pulley;

a mounting frame, wherein the pulley system is mounted to a first side of the mounting frame and the gear set is mounted to a second side of the mounting frame, wherein the mounting frame comprise a plurality of cooling holes for directing cooling air from the first side to the second side;

a centrifugal compressor, comprising:

an inlet;

an outlet; and an impeller driven by the gear set and configured to pull air into the inlet, compress the air, and direct the air to the outlet; and an inner plate coupled to a gearbox housing the gear set on a side of the gearbox that is opposite the mounting frame, the inner plate comprising a recessed portion; and thermal insulation disposed in the recessed portion for reducing an amount of heat transfer to the gearbox from the centrifugal compressor.

2. The centrifugal blower of claim 1, wherein a plurality of channels emanates from the plurality of cooling holes on the second side of the mounting frame for increasing airflow to the gear set.

3. The centrifugal blower of claim 1, further comprising:

a belt guard coupled to the first side of the mounting frame and comprising an air inlet, wherein the driving pulley comprises a plurality of fan blades configured to draw air in through the air inlet.

4. The centrifugal blower of claim 1, further comprising a belt tensioner in contact with the pulley belt to set a preload in the pulley belt.

5. The centrifugal blower of claim 4, further comprising an adjustment system for incrementally adjusting a position of the belt tensioner.

6. The centrifugal blower of claim 1, wherein the gear set comprises a driving gear meshed with a pinion gear.

7. The centrifugal blower of claim 5, wherein the adjustment system is configured to adjust an angle of the belt tensioner in increments in a range of 0.5 degrees to 10 degrees.

8. A centrifugal blower, comprising:

a motor;

a centrifugal compressor;

a drive system, comprising:

a pulley system;

a belt tensioner coupled to the pulley system; and a gear set comprising an input gear and an output gear, wherein the pulley system is driven by the motor to drive the gear set and the gear set drives the centrifugal compressor;

a mounting frame having the belt tensioner and the drive system mounted thereon, wherein the mounting frame comprises a recess for receiving a gearbox housing the gear set, and wherein the recess comprises a plurality of channels to increase airflow to the gear set;

a plurality of cooling holes extending through the mounting frame, emanating from the plurality of cooling holes, and disposed proximally to the gear set; and an adjustment system for adjusting a position of the belt tensioner to adjust a preload in a pulley belt of the pulley system.

9. The centrifugal blower of claim 8, wherein the adjustment system comprises:

a proximal plate coupled to the belt tensioner, the proximal plate having a first plurality of holes about at least a portion of a circumference thereof, wherein each hole of the first plurality of holes is separated by a first distance; and an outer plate disposed within an opening of the mounting frame, the outer plate having a second plurality of holes about a circumference thereof, wherein each hole of the second plurality of holes is separated by a second distance;

an inner plate configured to be received within the outer plate; and a distal plate having a third plurality of holes about a circumference thereof, wherein each hole of the third plurality of holes is separated by the first distance, wherein the first distance is distinct from the second distance.

10. The centrifugal blower of claim 9, wherein rotation of the belt tensioner rotates the proximal plate, thereby changing an alignment of the first plurality of holes with the second plurality of holes, and wherein the position of the belt tensioner is fixed by coupling the proximal plate to the distal plate via a fastener inserted through a hole of the first plurality of holes that is at least partially aligned with corresponding holes in the second plurality of holes and the third plurality of holes.

11. The centrifugal blower of claim 10, wherein the adjustment system is configured to adjust an angle of the belt tensioner in increments in a range of 0.5 degrees to 10 degrees.

12. The centrifugal blower of claim 8, further comprising a belt guard coupled to a first side of the mounting frame.

13. The centrifugal blower of claim 12, wherein the belt guard comprises a sound insulating material.

14. The centrifugal blower of claim 8, further comprising:

an inner plate coupled to the gearbox housing the gear set on a side opposite the mounting frame, the inner plate comprising a recessed portion; and thermal insulation disposed in the recessed portion for reducing an amount of heat transfer to the gearbox from the centrifugal compressor.

15. A geared centrifugal blower, comprising:

a mounting frame;

a motor having a shaft extending through the mounting frame;

a centrifugal compressor;

a drive system, comprising:

a pulley system comprising a driving pulley coupled to the shaft and a driven pulley, the driving pulley and the driven pulley interconnected by a pulley belt; and a gear set coupled to the driven pulley via an input shaft and to the centrifugal compressor;

a plurality of cooling holes in the mounting frame, the plurality of cooling holes surrounding the driven pulley;

a belt tensioner for setting a preload in the pulley belt; and an adjustment system for adjusting a position of the belt tensioner to adjust the preload in the pulley belt, wherein the mounting frame comprises a recess for receiving a gearbox for the gear set, wherein the recess is fluidly connected to the plurality of cooling holes, and wherein the recess comprises a plurality of channels emanating from the plurality of cooling holes for increasing airflow around the gearbox.

16. The geared centrifugal blower of claim 15, further comprising:

an inner plate disposed between the gearbox and the centrifugal compressor, wherein the inner plate comprises a recessed surface for receiving insulation therein, thereby reducing heat transferred from the centrifugal compressor to the gearbox.

17. The geared centrifugal blower of claim 15, further comprising:

a belt guard for encasing the pulley system, the belt guard having an air inlet located proximal to the driving pulley, wherein the driving pulley comprises a plurality of fan blades that pull air in the air inlet when the driving pulley is rotated by the motor.

18. The geared centrifugal blower of claim 15, wherein the adjustment system is configured to incrementally adjust the position of the belt tensioner to adjust the preload in the pulley belt provided by the belt tensioner.

19. The geared centrifugal blower of claim 15, wherein the motor is driven by a variable frequency drive system.

20. The geared centrifugal blower of claim 15, further comprising a desiccant breather coupled to the gearbox housing the gear set.

* * * * *